(12) United States Patent
Hishiki et al.

(10) Patent No.: US 11,632,907 B2
(45) Date of Patent: Apr. 25, 2023

(54) AGRICULTURAL WORK APPARATUS, AGRICULTURAL WORK MANAGEMENT SYSTEM, AND PROGRAM

(71) Applicant: Inaho, Inc., Kanagawa (JP)

(72) Inventors: Yutaka Hishiki, Kanagawa (JP); Sohya Ohyama, Kanagawa (JP)

(73) Assignee: Inaho, Inc., Kanagawa (JP)

( * ) Notice: Subject to any disclaimer, the term of this patent is extended or adjusted under 35 U.S.C. 154(b) by 581 days.

(21) Appl. No.: 16/613,295

(22) PCT Filed: May 17, 2017

(86) PCT No.: PCT/JP2017/018517
§ 371 (c)(1),
(2) Date: Nov. 13, 2019

(87) PCT Pub. No.: WO2018/211621
PCT Pub. Date: Nov. 22, 2018

(65) Prior Publication Data
US 2021/0076570 A1 Mar. 18, 2021

(51) Int. Cl.
*A01D 46/30* (2006.01)
*G06T 7/70* (2017.01)
(Continued)

(52) U.S. Cl.
CPC .......... *A01D 46/30* (2013.01); *A01D 45/007* (2013.01); *A01M 21/02* (2013.01); *A01M 99/00* (2013.01);
(Continued)

(58) Field of Classification Search
CPC ..... A01D 46/30; A01D 45/007; A01M 21/02; A01M 99/00; A01M 7/0089; A01M 21/00;
(Continued)

(56) References Cited

U.S. PATENT DOCUMENTS

| 9,313,944 | B1 * | 4/2016 | Faivre ............... A01M 21/02 |
| 2005/0126144 | A1 * | 6/2005 | Koselka ............. A01D 46/30 56/10.2 R |

(Continued)

FOREIGN PATENT DOCUMENTS

| EP | 1 958 494 | * | 2/2008 |
| ES | 2540676 B | | 2/2016 |

(Continued)

OTHER PUBLICATIONS

Machine translation for JP2014-183841, IDS (description) (Year: 2014).*

(Continued)

*Primary Examiner* — Qian Yang
(74) *Attorney, Agent, or Firm* — Alston & Bird LLP

(57) ABSTRACT

An object of the present invention is to provide an agricultural work apparatus, an agricultural work management system, and a program capable of appropriately managing agricultural work information and smoothly implementing agricultural work and business in the future by making use of agricultural work information. An agricultural work apparatus may include: a first image-capturing device; an agricultural work determination unit that determines, on the basis of first image information obtained by capturing an image of a target of agricultural work through the first image-capturing device, whether or not to execute the agricultural work on the target; an agricultural work execution unit that executes the agricultural work; an agricultural work information generation unit that generates agricultural work information including a result of the agricultural work; a measurement unit that measures a position of the target; and an agricultural work information management unit that manages the agricultural work information and positional information.

15 Claims, 14 Drawing Sheets

(51) Int. Cl.
| | | |
|---|---|---|
| *A01D 45/00* | (2018.01) | |
| *A01M 21/02* | (2006.01) | |
| *A01M 99/00* | (2006.01) | |
| *G05D 1/00* | (2006.01) | |
| *G05D 1/02* | (2020.01) | |
| *G06T 7/00* | (2017.01) | |
| *G06T 7/60* | (2017.01) | |
| *H04N 23/90* | (2023.01) | |

(52) U.S. Cl.
CPC ......... *G05D 1/0088* (2013.01); *G05D 1/0278* (2013.01); *G06T 7/0002* (2013.01); *G06T 7/60* (2013.01); *G06T 7/70* (2017.01); *G05D 2201/0201* (2013.01); *G06T 2207/30188* (2013.01); *G06T 2207/30204* (2013.01); *H04N 23/90* (2023.01)

(58) Field of Classification Search
CPC ............... G05D 1/0088; G05D 1/0278; G05D 2201/0201; G06T 7/0002; G06T 7/60; G06T 7/70; G06T 2207/30188; G06T 2207/30204; H04N 5/247; G07C 3/08; A01B 69/001
See application file for complete search history.

(56) References Cited

U.S. PATENT DOCUMENTS

| | | | | |
|---|---|---|---|---|
| 2006/0093185 A1* | 5/2006 | Kato | ................... | G06V 40/167 |
| | | | | 382/103 |
| 2015/0262347 A1* | 9/2015 | Duerksen | .............. | G06T 7/0002 |
| | | | | 382/182 |
| 2017/0118925 A1 | 5/2017 | Noguchi et al. | | |
| 2017/0131718 A1* | 5/2017 | Matsumura | .......... | A01B 69/008 |
| 2017/0351933 A1* | 12/2017 | Bleiweiss | ............... | G06T 17/05 |

FOREIGN PATENT DOCUMENTS

| | | | |
|---|---|---|---|
| JP | H06-141649 A | | 5/1994 |
| JP | H06-231329 A | | 8/1994 |
| JP | 4379001 | * | 5/2003 |
| JP | 2004-203514 A | | 7/2004 |
| JP | 2008-206438 A | | 9/2008 |
| JP | 2009-131223 A | | 6/2009 |
| JP | 2011-115044 A | | 6/2011 |
| JP | 2011-229406 A | | 11/2011 |
| JP | 2012-055207 A | | 3/2012 |
| JP | 2013-074807 A | | 4/2013 |
| JP | 2013-235461 A | | 11/2013 |
| JP | 2014-183841 A | | 10/2014 |
| WO | WO 2016/009752 A1 | | 1/2016 |

OTHER PUBLICATIONS

Machine translation for JP2013-074807, IDS (Year: 2013).*
Machine translation for JP2014-183841, IDS (claims) (Year: 2014).*
Machine translation for EP 1 958 494 (Year: 2008).*
Machine translation for JP 4379001 (Year: 2003).*
International Search Report and Written Opinion for Application No. PCT/JP2017/018517 dated Jul. 18, 2017, 10 pages.

* cited by examiner

Fig. 3

| DATE AND TIME WHEN POSITION MEASURED | AGRICULTURAL WORK POSITION | | AGRICULTURAL WORK INFORMATION | |
|---|---|---|---|---|
| | LATITUDE(°) | LONGITUDE(°) | PRESENCE/ABSENCE OF HARVESTING | YIELD AMOUNT (NUMBER) |
| 2017/4/1 15:31:00 | 24.1635 | 139.2754 | Yes | 6 |
| 2017/4/1 15:32:00 | 24.1640 | 139.2754 | Yes | 5 |
| 2017/4/1 15:3300 | 24.1640 | 139.2760 | No | 0 |
| 2017/4/1 15:34:00 | 24.1642 | 139.2763 | Yes | 3 |
| 2017/4/1 15:35:00 | 24.1643 | 139.2763 | Yes | 10 |
| ... | ... | ... | ... | ... |
| 2017/4/1 18:50:00 | 24.1720 | 139.2940 | Yes | 14 |
| 2017/4/1 18:51:00 | 24.1725 | 139.2947 | No | 0 |

Fig. 4

| DATE AND TIME WHEN POSITION MEASURED | AGRICULTURAL WORK POSITION | | AGRICULTURAL WORK INFORMATION | |
|---|---|---|---|---|
| | LATITUDE(°) | LONGITUDE(°) | ORIENTATION(°) | IMAGE INFORMATION |
| 2017/4/1 15:31:00 | 24.1635 | 139.2754 | 120 | XXXX.jpg |
| 2017/4/1 15:32:00 | 24.1640 | 139.2754 | 50 | XXXX.jpg |
| 2017/4/1 15:33:00 | 24.1640 | 139.2760 | 190 | XXXX.jpg |
| 2017/4/1 15:34:00 | 24.1642 | 139.2763 | -60 | XXXX.jpg |
| 2017/4/1 15:35:00 | 24.1643 | 139.2763 | 240 | XXXX.jpg |
| ⋮ | ⋮ | ⋮ | ⋮ | ⋮ |
| 2017/4/1 18:50:00 | 24.1720 | 139.2940 | 30 | XXXX.jpg |
| 2017/4/1 18:51:00 | 24.1725 | 139.2947 | 90 | XXXX.jpg |

Fig. 5

| DATE AND TIME WHEN POSITION MEASURED | AGRICULTURAL WORK POSITION | | AGRICULTURAL WORK INFORMATION | |
|---|---|---|---|---|
| | LATITUDE(°) | LONGITUDE(°) | PRESENCE/ABSENCE OF HARVESTING | AMOUNT OF IRREGULAR/DISEASE (NUMBER) |
| 2017/4/1 15:31:00 | 24.1635 | 139.2754 | Yes | 1 |
| 2017/4/1 15:32:00 | 24.1640 | 139.2754 | Yes | 0 |
| 2017/4/1 15:3300 | 24.1640 | 139.2760 | No | 2 |
| 2017/4/1 15:34:00 | 24.1642 | 139.2763 | Yes | 0 |
| 2017/4/1 15:35:00 | 24.1643 | 139.2763 | Yes | 1 |
| ⋮ | ⋮ | ⋮ | ⋮ | ⋮ |
| 2017/4/1 18:50:00 | 24.1720 | 139.2940 | Yes | 0 |
| 2017/4/1 18:51:00 | 24.1725 | 139.2947 | No | 3 |

Fig. 6

| DATE AND TIME WHEN POSITION MEASURED | AGRICULTURAL WORK POSITION | | AGRICULTURAL WORK INFORMATION |
|---|---|---|---|
| | LATITUDE(°) | LONGITUDE(°) | SPRAYED AMOUNT OF CHEMICALS(g) |
| 2017/4/1 15:31:00 | 24.1635 | 139.2754 | 50 |
| 2017/4/1 15:32:00 | 24.1640 | 139.2754 | 150 |
| 2017/4/1 15:33:00 | 24.1640 | 139.2760 | 200 |
| 2017/4/1 15:34:00 | 24.1642 | 139.2763 | - |
| 2017/4/1 15:35:00 | 24.1643 | 139.2763 | 300 |
| ... | ... | ... | ... |
| 2017/4/1 18:50:00 | 24.1720 | 139.2940 | 100 |
| 2017/4/1 18:51:00 | 24.1725 | 139.2947 | 400 |

AGRICULTURAL WORK APPARATUS, AGRICULTURAL WORK MANAGEMENT SYSTEM, AND PROGRAM

CROSS-REFERENCE TO RELATED APPLICATIONS

This application is a national stage application filed under 35 U.S.C. § 371 of International Application No. PCT/JP2017/018517 filed May 17, 2017 and published as WO2018211621, which application is hereby incorporated by reference herein in its entirety.

TECHNICAL FIELD

The present invention relates to an agricultural work apparatus, an agricultural work management system, and a program.

BACKGROUND ART

More importance has been given to integrating various kinds of agricultural work data such as crop data per field and making use of the data for future agricultural work plans and business plans along with rationalization of farming and performance increase of agricultural apparatuses.

In regard to this, Patent Document 1 discloses an agricultural apparatus data collection device to be mounted to an agricultural apparatus to transmit data on the apparatus to a management terminal through a communication line. The data collection device is configured to automatically create a data file set in a storage device of the management terminal, and the names of files include at least one or a plurality of elements such as the date of work, the identification code of the apparatus, the name of the worker, and the field number.

CITATION LIST

Patent Document

Patent Document 1: Patent Publication JP-A-H06-231329

SUMMARY

Technical Problem

In the data collection device in Patent Document 1, field data can be collected, but after the field data is collected, the relevance between the position at which the field data is collected and the field data cannot be derived. Thus, the field data cannot be appropriately managed, and the field data cannot be effectively utilized, and hence agricultural work and business could not be smoothly implemented in the future.

The present invention has been made in view of the above-mentioned circumstances, and an object thereof is to provide an agricultural work apparatus, an agricultural work management system, and a program capable of appropriately managing agricultural work information and smoothly implementing agricultural work and business in the future by making use of the agricultural work information.

Solution to Problem

An agricultural work apparatus according to one embodiment of the present invention includes: a first image-capturing device; an agricultural work determination unit that determines, on the basis of first image information obtained by capturing an image of a target of agricultural work through the first image-capturing device, whether or not to execute the agricultural work on the target; an agricultural work execution unit that executes the agricultural work on the basis of a determination result of the agricultural work determination unit; an agricultural work information generation unit that generates agricultural work information including a result of the agricultural work; a measurement unit that measures a position of the target; and an agricultural work information management unit that manages the agricultural work information and positional information indicating the measured position.

The agricultural work apparatus may further include an abnormality determination unit that determines presence or absence of abnormality in the target on the basis of the first image information and second image information that is a reference image including the target.

In the agricultural work apparatus, the measurement unit may measure a dimension of the target on the basis of the first image information, and the agricultural work determination unit may determine whether or not to execute the agricultural work on the target on the basis of a result of comparison between the measured dimension and a predetermined threshold and the presence/absence of the abnormality.

In the agricultural work apparatus, the agricultural work information management unit may record time information indicating a time taken to measure the position of the target in association with the agricultural work information and the positional information.

The agricultural work apparatus may further include an arm device for executing the agricultural work, and the agricultural work execution unit may control the operation on the basis of the position of the target measured by the measurement unit.

In the agricultural work apparatus, the arm device may include a second image-capturing device, and the agricultural work execution unit may control the operation of the arm device on the basis of third image information obtained by the second image-capturing device imaging the target.

The agricultural work apparatus may further include a drive device that controls the agricultural work apparatus to move along a predetermined route, and the drive device may control the movement of the agricultural work apparatus after it is determined by the agricultural work determination unit whether or not to execute the agricultural work on the target included in the first image information.

In the agricultural work apparatus, the first image-capturing device may detect a marker disposed on the route, and the drive device may control the movement of the agricultural work apparatus on the basis of the detected marker.

In the agricultural work apparatus, the position of the target measured by the measurement unit may include a position at which the first image-capturing device images the target.

An agricultural work management system according to one embodiment of the present invention includes: the agricultural work apparatus according to any one of claims 1 to 9; and an agricultural work management server, in which the agricultural work apparatus transmits the agricultural work information indicating a result of the agricultural work and the positional information to the agricultural work management server, and the agricultural work management server includes an agricultural work prediction unit that predicts a content of the agricultural work to be executed on the target on the basis of the agricultural work information and the positional information.

The agricultural work management system may further include a mobile terminal including an output unit, the agricultural work management server may further include an output information generation unit that generates output information for outputting the agricultural work information and the positional information in association with each other in a predetermined output form, and the output unit may output the agricultural work information and the positional information in the predetermined output form on the basis of the output information.

A program according to one embodiment of the present invention causes an agricultural work apparatus including an image-capturing device to function as: an agricultural work determination unit that determines, on the basis of image information obtained by capturing an image of a target of agricultural work through the first image-capturing device, whether or not to execute the agricultural work on the target; an agricultural work execution unit that executes the agricultural work on the basis of a determination result of the agricultural work determination unit; an agricultural work information generation unit that generates agricultural work information including a result of the agricultural work; a measurement unit that measures a position of the target; and an agricultural work information management unit that manages the agricultural work information and positional information indicating the measured position.

In each embodiment, "unit", "device", and "system" do not simply mean physical means, but include the case where functions of the "unit", "device", and "system" are implemented by software. The functions of one "unit", "device", and "system" may be implemented by two or more physical means and devices, and the functions of two or more "units", "devices", and "systems" may be implemented by single physical means and device.

Advantageous Effects of Invention

According to the present invention, agricultural work information and the position of a target are managed in association with each other, and hence the agricultural work information can be appropriately managed, and agricultural work and business can be smoothly implemented in the future by making use of the agricultural work information.

BRIEF DESCRIPTION OF DRAWINGS

FIG. 3 is a diagram illustrating an example of an agricultural work information table recorded in a recording device in the agricultural work apparatus according to one embodiment of the present invention.

FIG. 4 is a diagram illustrating an example of the agricultural work information table recorded in the recording device in the agricultural work apparatus according to one embodiment of the present invention.

FIG. 5 is a diagram illustrating an example of the agricultural work information table recorded in the recording device in the agricultural work apparatus according to one embodiment of the present invention.

FIG. 6 is a diagram illustrating an example of the agricultural work information table recorded in the recording device in the agricultural work apparatus according to one embodiment of the present invention.

DESCRIPTION OF EMBODIMENTS

Figure 1:
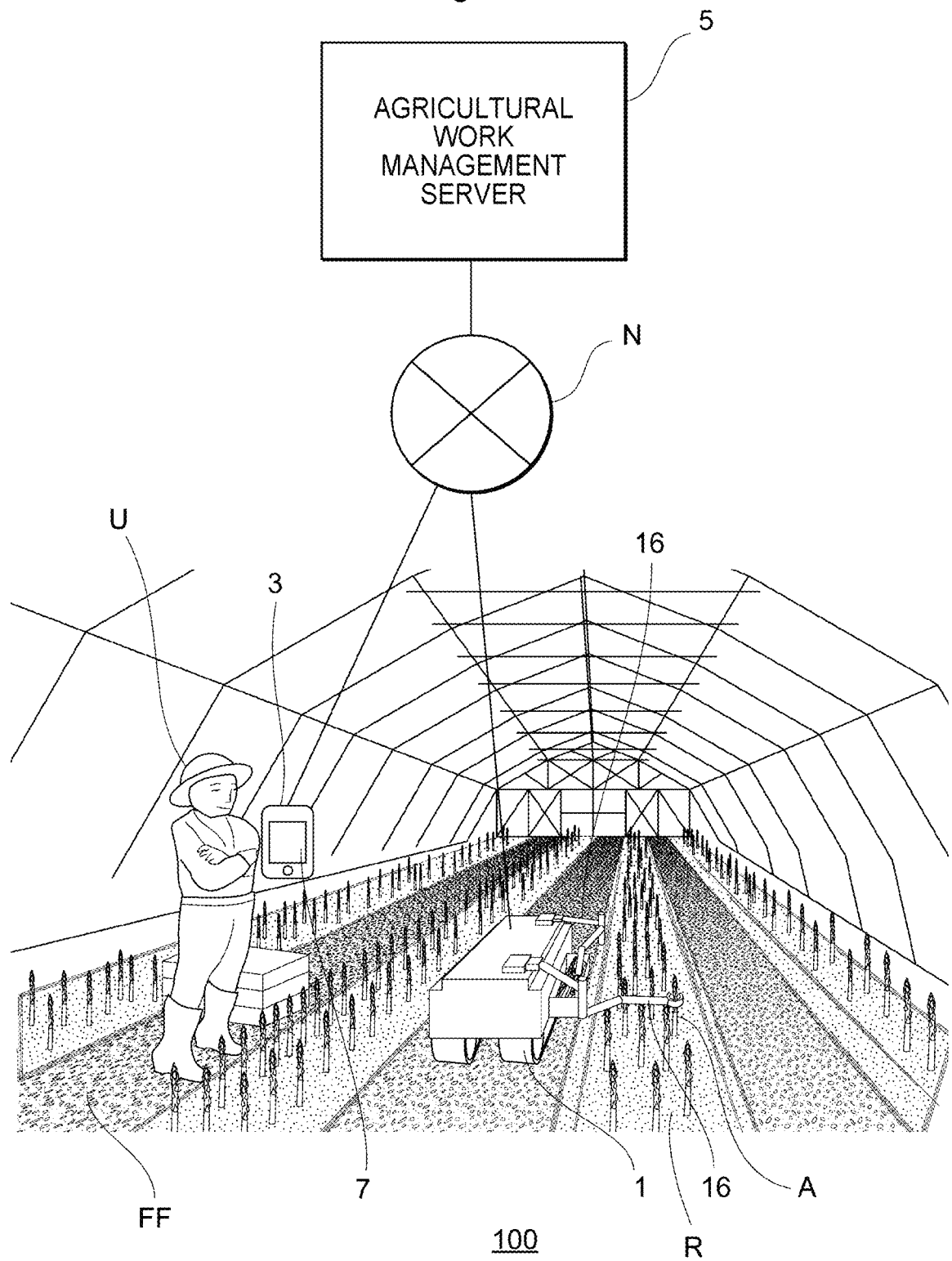
FIG. 1 is a block diagram illustrating an example of a schematic configuration of an agricultural work management system according to one embodiment of the present invention.

Referring to the drawings, one embodiment is described below. The embodiments described below are merely illustrative, and are not intended to exclude the applications of various modifications and technologies that are not specified below. In other words, the present invention can be variously modified within the range not departing from the gist thereof. In the illustration of a series of the drawings, the same or similar parts are denoted by the same or similar reference symbols.

[Overall Configuration of Agricultural Work Management System]

FIG. 1 is a block diagram illustrating an example of a schematic configuration of an agricultural work management system according to one embodiment of the present invention. As illustrated in FIG. 1, an agricultural work management system 100 exemplarily includes an agricultural work apparatus 1 for executing agricultural work in a field FF and managing results of the agricultural work, an agricultural work management server 5 for managing the results of the agricultural work executed by the agricultural work apparatus 1 and predicting contents of agricultural work to be executed in the future on the basis of the results of the agricultural work, and a mobile terminal 3 held by a user U who engages in agricultural work.

Examples of "agricultural work" include harvesting asparagus A (target) disposed on a ridge R, spraying a field FF with chemicals, and removing weeds in the field FF. The "target" of agricultural work is not limited to crops such as the asparagus A, and may include a ground part such as the ridge R formed in the field FF and a predetermined space in the field FF.

The agricultural work apparatus 1, the mobile terminal 3, and the agricultural work management server 5 are connected so as to be mutually communicable through a predetermined communication network N. For example, the agricultural work apparatus 1 receives an instruction for executing agricultural work by the agricultural work apparatus 1 from the mobile terminal 3 through the communication network N. Based on the instruction from the mobile terminal 3, for example, the agricultural work apparatus 1 harvests the asparagus A cropped on the ridge R by using arms 16. The agricultural work apparatus 1 generates agricultural work information including results of the agricultural work, and transmits at least the agricultural work information and positional information to the agricultural work management server 5 through the communication network N. The agricultural work management server 5 transmits at least the agricultural work information and positional information to the mobile terminal 3 through the communication network N. The mobile terminal 3 receives at least the agricultural work information and positional information from the agricultural work management server 5 through the communication network N, and outputs the agricultural work information and the positional information from an output unit 7.

In this manner, the agricultural work information and the position of the target are managed in association with each other, and hence the agricultural work information can be appropriately managed, and agricultural work and business can be smoothly implemented in the future by making use of the agricultural work information. The user U can check the results of agricultural work executed by the agricultural work apparatus 1 through the output unit 7 of the mobile terminal 3. For example, when the user U is a producer of crops, the user U can present the spray volume of chemicals, which is an example of the results of agricultural work output from the output unit 7 of the mobile terminal 3, to consumers to declare the safety and security of crops to the consumers. Further, the mobile terminal 3 may be a through-glass type terminal with augmented reality (AR) technology. In this case, when the user U sees a ridge R while wearing the glass type terminal, emphasized display such as highlighting of a region including an unharvested part in the ridge R is executed. In this manner, the user U can easily specify the unharvested part.

The communication network N may be a combination of the Internet, a packet communication network, and a line communication network. For example, the communications between the agricultural work apparatus 1, the mobile terminal 3, and the agricultural work management server 5 are wireless networks, but may include a wired network.

In the agricultural work management system 100, the numbers of the agricultural work apparatus 1, the mobile terminals 3, and the agricultural work management servers 5 can be freely set, and the numbers may each be two or more.

[Configuration of Agricultural Work Apparatus]

Figure 2:
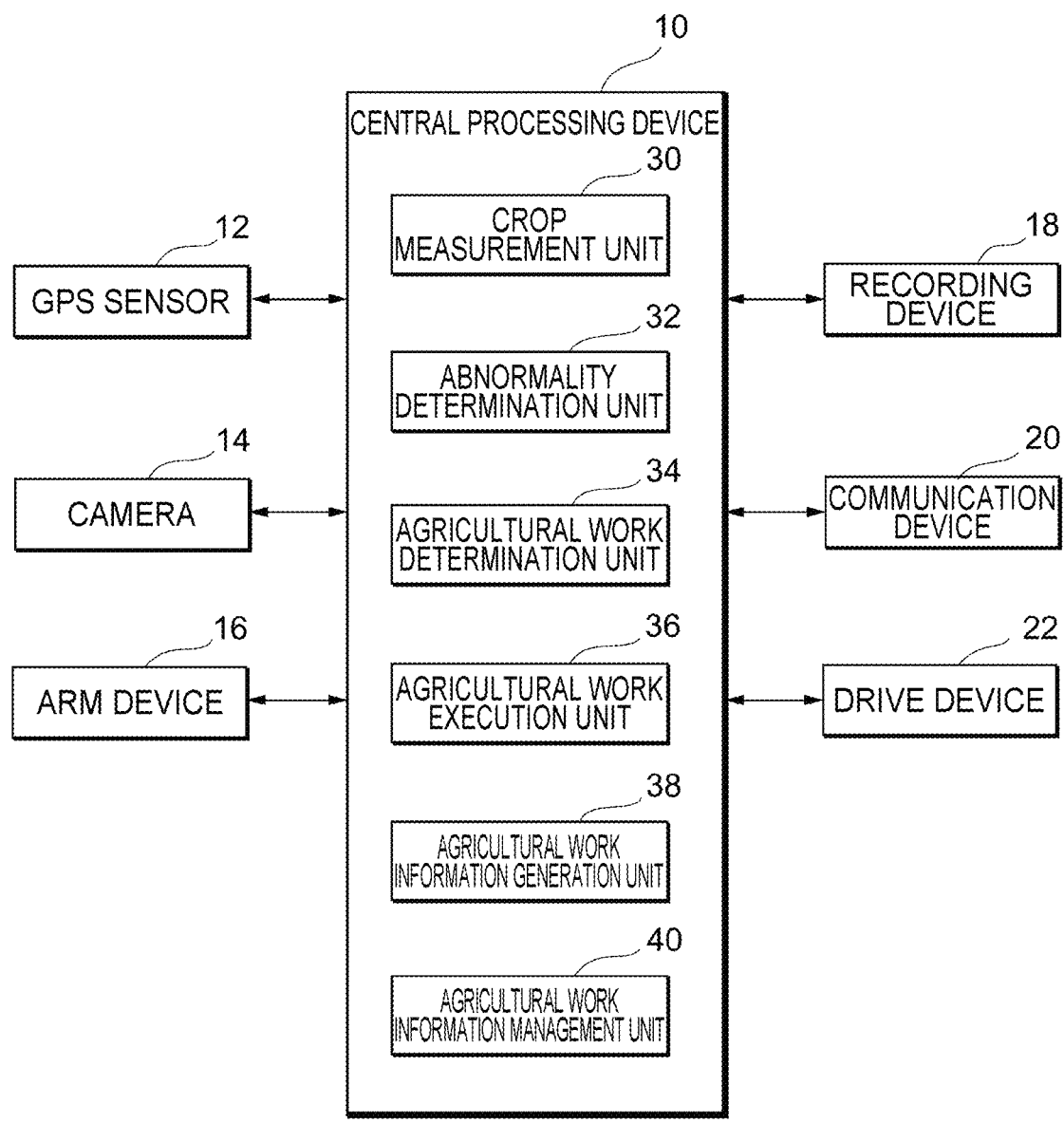
FIG. 2 is a block diagram illustrating an example of a schematic configuration of the agricultural work apparatus according to one embodiment of the present invention.

FIG. 2 is a block diagram illustrating an example of a schematic configuration of the agricultural work apparatus according to one embodiment of the present invention. As illustrated in FIG. 2, the agricultural work apparatus 1 exemplarily includes a GPS sensor 12 for detecting the position of the agricultural work apparatus 1 on the basis of GPS signals transmitted from GPS satellites (not shown), a camera 14 (first image-capturing device) for imaging an agricultural work target, an arm device 16 for executing agricultural work, a recording device 18 for recording information necessary for each piece of processing executed by the agricultural work apparatus 1, a communication device 20 for transmitting and receiving various kinds of information to and from the mobile terminal 3 and the agricultural work management server 5 illustrated in FIG. 1, a drive device 22 for controlling the agricultural work apparatus 1 to move along a predetermined route, and a central processing device 10 connected to each of the above-mentioned components. Each of the above-mentioned components may be a single component or may be a component including a plurality of components. For example, the camera 14 includes at least one of a time-of-flight (TOF) range image sensor using pulsed laser having anti-ambient light performance and a camera including a charge-coupled device (CCD).

The central processing device 10 controls each of the above-mentioned components in order to execute processing for managing agricultural work information. For example, the central processing device 10 is a CPU or an MPU, and operates in accordance with a program stored in the recording device 18. The central processing device 10 functionally includes a crop measurement unit 30 (measurement unit) for measuring the position, height and depth of a target, an abnormality determination unit 32 for determining abnormality in a target, such as whether the target is irregular and whether the target has a disease, an agricultural work determination unit 34 for determining whether or not to execute agricultural work on a target on the basis of image information (first image information) obtained by the camera 14 imaging the target of agricultural work, an agricultural work execution unit 36 for executing agricultural work on the basis of a determination result of the agricultural work determination unit 34, an agricultural work information generation unit 38 for generating agricultural work information including a result of agricultural work, and an agricultural work information management unit 40 for managing the agricultural work information generated by the agricultural work information generation unit 38. The irregular crop is also referred to as "defect".

The recording device 18 records agricultural work information generated by the agricultural work information generation unit 38. For example, the recording device 18 records agricultural work information as agricultural work information tables illustrated in FIG. 3 to FIG. 6.

As illustrated in FIG. 3, the recording device 18 records agricultural work information including the presence/absence of harvesting of a target and the yield amount in association with the agricultural work position (positional information) including the position at which the target is cultivated and the date and time when the agricultural work position is measured.

As illustrated in FIG. 4, the recording device 18 records agricultural work information including the orientation of the agricultural work apparatus 1 illustrated in FIG. 1 when harvesting a target and image information including a harvesting target in association with the agricultural work position and the date and time when the agricultural work position is measured.

As illustrated in FIG. 5, the recording device 18 records agricultural work information including the presence/absence of harvesting of a target and the amount of irregulars and diseases of the target in association with the agricultural work position and the date and time when the agricultural work position is measured.

As illustrated in FIG. 6, the recording device 18 records agricultural work information including the spray amount of chemicals in association with the position at which the chemical is sprayed as the agricultural work position and the date and time when the position is measured.

When the agricultural work apparatus 1 is a weed removal device for removing weeds, the recording device 18 may record the weight of removed weeds as agricultural work information in association with the position of removed weeds (or the position of the agricultural work apparatus 1 to execute removal processing) and the date and time when the weeds are removed.

The agricultural work information tables illustrated in FIG. 3 to FIG. 6 may be recorded in the recording device 18 in association with one another. An agricultural work information table may be configured by combining at least two of the agricultural work information tables illustrated in FIG. 3 to FIG. 6.

The agricultural work position may be the position of the agricultural work apparatus 1 detected by the GPS sensor 12 illustrated in FIG. 1. The agricultural work position may be the position of each of a plurality of targets. Each position of the plurality of targets may be, for example, information indicating how near (front) or far (behind) the crop is disposed on a ridge with respect to the agricultural work apparatus 1. The orientation information in the agricultural work information table illustrated in FIG. 4 is an orientation indicated by an angle with reference to a predetermined direction, and may be associated with each target when each of the plurality of targets is harvested or may be associated with each group when a target group including a plurality of targets is harvested. The image information in the agricultural work information table illustrated in FIG. 4 may be image information including a single target or may be image information including a plurality of targets. The image information may be image information indicating a situation where the agricultural work apparatus 1 sprays chemicals, or may be image information indicating a situation after the agricultural work apparatus 1 sprays chemicals.

For example, the recording device 18 may be configured by an information recording medium such as a ROM, a RAM, and a hard disk, and is an information recording medium for holding a program executed by the central processing device 10. The recording device 18 operates as a work memory of the central processing device 10. For example, the program stored in the recording device 18 may be provided by being downloaded from the outside of the agricultural work apparatus 1 through a network, or may be provided by various kinds of computer-readable information recording media such as a CD-ROM and a DVD-ROM.

For example, as illustrated in FIG. 1, the communication device 20 receives an instruction for executing agricultural work from the mobile terminal 3 through the communication network N. On the other hand, for example, the communication device 20 transmits the agricultural work information tables illustrated in FIG. 3 to FIG. 6 to the agricultural work management server 5 through the communication network N.

For example, the drive device 22 is movement wheels supported by right and left axles. By rotating the movement wheels, the agricultural work apparatus 1 can move forward and backward, and turn.

[Configuration of Agricultural Work Management Server]

Figure 7:
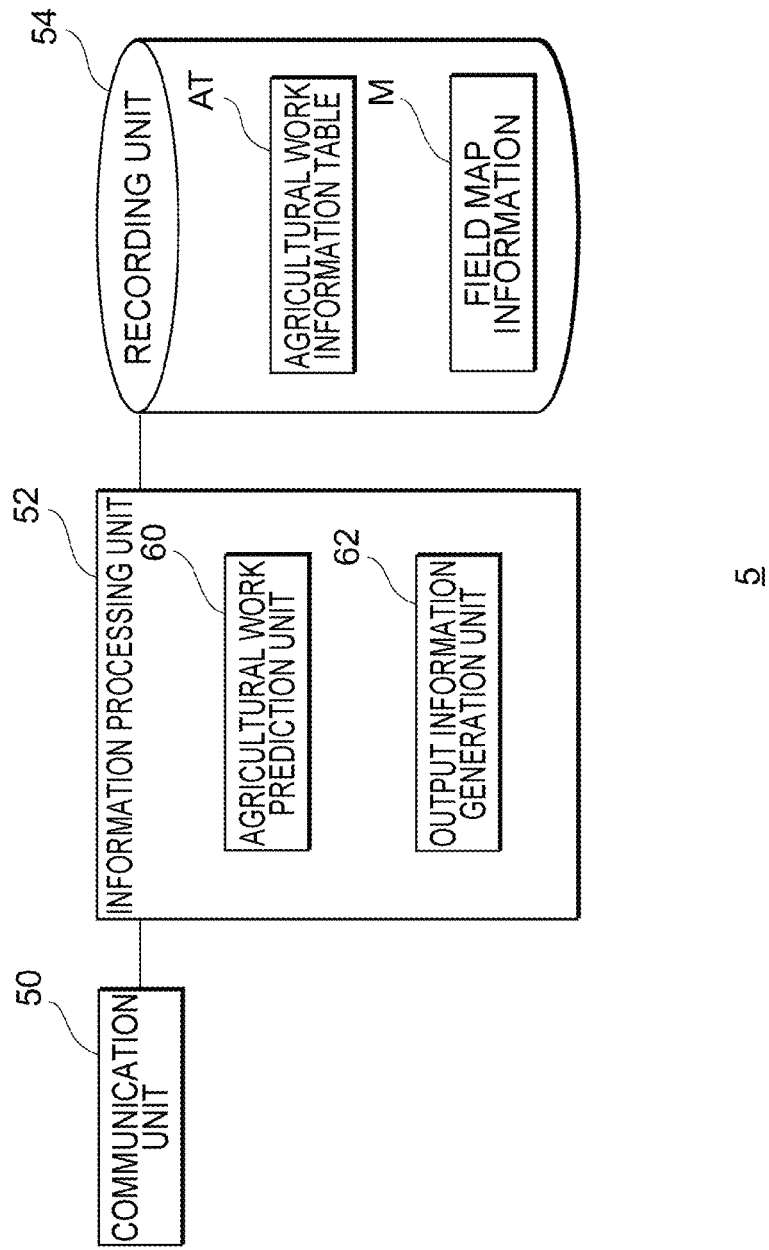
FIG. 7 is a block diagram illustrating an example of a schematic configuration of an agricultural work management server according to one embodiment of the present invention.

FIG. 7 is a block diagram illustrating an example of a schematic configuration of the agricultural work management server according to one embodiment of the present invention. As illustrated in FIG. 7, the agricultural work management server 5 exemplarily includes a communication unit 50 for transmitting and receiving various kinds of information to and from the agricultural work apparatus 1 and the mobile terminal 3 illustrated in FIG. 1, an information processing unit 52 for executing information processing based on agricultural work information, and a recording unit 54 that stores therein agricultural work information tables AT (see FIG. 3 to FIG. 6) indicating agricultural work information transmitted from the agricultural work apparatus 1 illustrated in FIG. 1 and a field map M indicating the field FF illustrated in FIG. 1 and FIG. 9. As described later, the field map M is used for the mobile terminal 3 illustrated in FIG. 1 to set an execution range of agricultural work and control a movement range where the agricultural work apparatus 1 actually executes the agricultural work. The recording unit 54 may record therein various kinds of programs related to various kinds of information processing executed by the information processing unit 52.

The information processing unit 52 functionally includes an agricultural work prediction unit 60 for predicting contents of agricultural work to be executed on a target on the basis of agricultural work information and positional information indicating the position of a target, which are transmitted from the agricultural work apparatus 1 illustrated in FIG. 1 and received by the communication unit 50, and an output information generation unit 62 for generating output information for outputting the agricultural work information and the positional information indicating the position of the target in association with each other in a predetermined output form. The agricultural work prediction unit 60 refers to image information on crops (target) as the agricultural work information to predict contents of future agricultural work in consideration of the state of the crops. For example, the agricultural work prediction unit 60 grasps the growth condition of each piece of asparagus from an image of an asparagus group, and measures a harvesting timing or a future prediction of the yield amount as an example of the contents of future agricultural work. The output information may include output information for outputting a prediction result of the agricultural work prediction unit 60 in a predetermined output form. In response to a request from the mobile terminal 3 illustrated in FIG. 1, the output information is transmitted to the mobile terminal 3 through the communication unit 50, and is output from the output unit 7 of the mobile terminal 3.

[Agricultural Work Processing]

Figure 8:
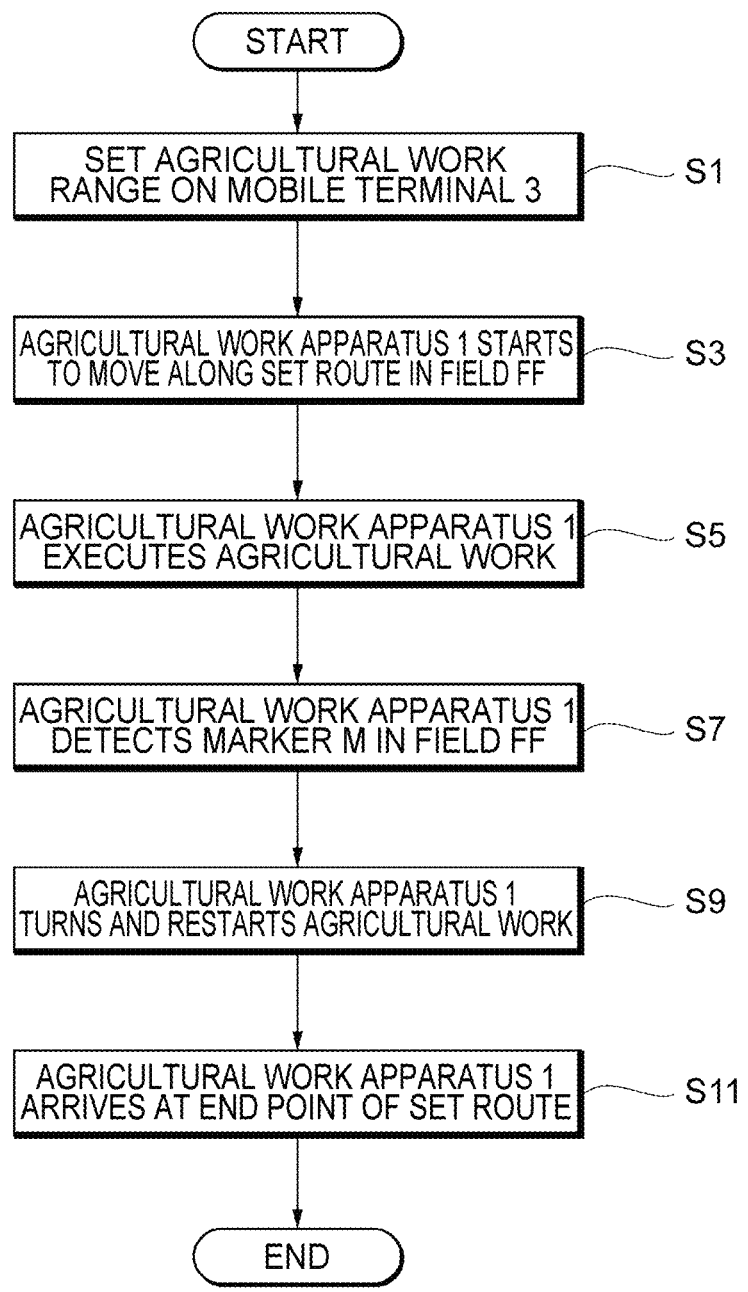
FIG. 8 is a flowchart illustrating an example of the flow of agricultural work processing according to one embodiment of the present invention.
Figure 9:
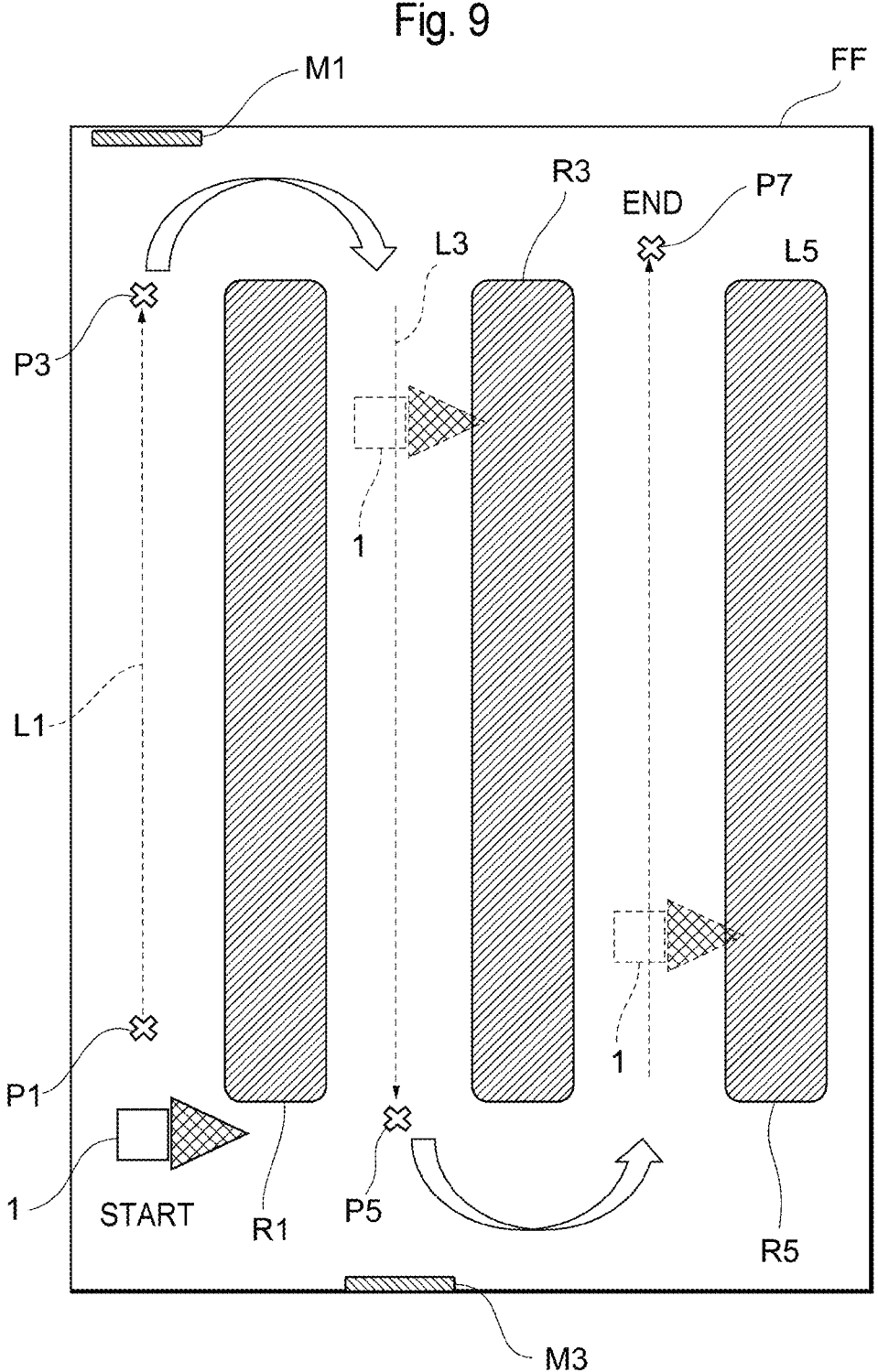
FIG. 9 is a diagram illustrating an example of agricultural work executed by an agricultural work apparatus in a field according to one embodiment of the present invention.

Referring to FIG. 8 and FIG. 9, the overall flow of agricultural work processing according to one embodiment of the present invention is described. FIG. 8 is a flowchart illustrating an example of the flow of agricultural work processing according to one embodiment of the present invention. FIG. 9 is a diagram illustrating an example of agricultural work executed by the agricultural work apparatus in a field according to one embodiment of the present invention.

(Step S1)

The user U illustrated in FIG. 1 uses the mobile terminal 3 to set an agricultural work range where the agricultural work apparatus 1 executes agricultural work. For example, the mobile terminal 3 acquires the field map information M illustrated in FIG. 7, which is recorded in the recording unit 54 in the agricultural work management server 5. The user U uses the mobile terminal 3 to set routes L1, L3, and L5 along which the agricultural work apparatus 1 moves in a field FF and a start point P1 at which the agricultural work apparatus 1 starts work and an end point P7 at which the agricultural work apparatus 1 finishes the work as illustrated in FIG. 9.

(Step S3)

The drive device 22 in the agricultural work apparatus 1 illustrated in FIG. 2 controls the agricultural work apparatus 1 to move along the set route L1 in the field FF. First, for example, the agricultural work apparatus 1 stops after moving by about 10 cm, and executes agricultural work as described later. After the agricultural work is completed, the agricultural work apparatus 1 moves again by about 10 cm, and executes agricultural work. The agricultural work apparatus 1 repeats this operation. The drive device 22 may be configured to control the movement of the agricultural work apparatus 1 after it is determined by the agricultural work determination unit 34 illustrated in FIG. 2 whether or not to execute agricultural work on all target included in image information (first image information) from the camera 14. The movement amount of the agricultural work apparatus 1 of about 10 cm has been described, but the movement amount is not limited thereto. The movement amount may be set as appropriate on the basis of the size of an object to be harvested, the arrangement position, and the size of a lens of the camera 14.

(Step S5)

The agricultural work apparatus 1 executes agricultural work. For example, the agricultural work execution unit 36 illustrated in FIG. 2 executes agricultural work on the basis of a determination result of the agricultural work determination unit 34 that determines whether or not to execute agricultural work on a target. The processing by the agricultural work determination unit 34 is described in detail later with reference to FIG. 10 to FIG. 12. The processing by the agricultural work execution unit 36 is described in detail later with reference to FIGS. 13 and 14. Examples of the agricultural work include harvesting a target disposed on a ridge R1, spraying the field FF with chemicals, and removing weeds in the field FF.

The agricultural work information generation unit 38 in the agricultural work apparatus 1 illustrated in FIG. 2 generates agricultural work information (see FIG. 3 to FIG. 6) including results of the agricultural work. The crop measurement unit 30 (measurement unit) measures a position to execute the agricultural work. Examples of the position to execute the agricultural work include the position of the agricultural work apparatus 1 that executes the agricultural work and the position of a target disposed in the field FF. The crop measurement unit 30 measures the position of the agricultural work apparatus 1 that executes the agricultural work on the basis of positional information detected by the GPS sensor 12 illustrated in FIG. 2. The crop measurement unit 30 measures the position of a target disposed in the field FF on the basis of positional information on the agricultural work apparatus 1 detected by the GPS sensor 12 illustrated in FIG. 2 and image information obtained by the camera 14 imaging the target. More specifically, the crop measurement unit 30 may estimate the position of a target disposed in the field FF on the basis of positional information on the agricultural work apparatus 1 detected by the GPS sensor 12 illustrated in FIG. 2, and then specify the accurate position of the target on the basis of image information obtained by the camera 14 imaging the target.

The agricultural work information management unit 40 manages agricultural work information, positional information indicating the position of the target measured by the crop measurement unit 30, and time information indicating a time taken to measure the position of the target in the recording device 18 in association with one another as the agricultural work information tables illustrated in FIG. 3 to FIG. 6. The communication device 20 in the agricultural work apparatus 1 illustrated in FIG. 2 transmits the agricultural work information tables recorded in the recording device 18 to the agricultural work management server 5 illustrated in FIG. 1 at a predetermined timing. For example, the communication device 20 may regularly transmit the agricultural work information tables, transmit the agricultural work information tables each time agricultural work is executed, or transmit the agricultural work information tables when a series of agricultural work are all finished.

(Step S7)

The camera 14 (first image-capturing device) in the agricultural work apparatus 1 illustrated in FIG. 2 detects a marker M1 in the field FF.

(Step S9)

The drive device 22 in the agricultural work apparatus 1 illustrated in FIG. 2 controls the movement of the agricultural work apparatus 1 on the basis of the marker M1 detected by the camera 14. For example, the agricultural work apparatus 1 detects the marker M1 to determine that the agricultural work apparatus 1 has arrived at a point P3, which is an end point of the field FF. The agricultural work apparatus 1 turns to move to the route L3, and restarts agricultural work on ridge R3. Next, the agricultural work apparatus 1 detects a marker M3 to determine that the agricultural work apparatus 1 has arrived at a point P5, which is an end point of the field FF. The agricultural work apparatus 1 uses the drive device 22 to turn, move to a route L5, and restarts agricultural work on a ridge R5.

(Step S11)

When the agricultural work apparatus 1 has arrived at a set end point P7 of the route L5, the agricultural work apparatus 1 finishes agricultural work.

[Agricultural Work Determination Processing]

Figure 10:
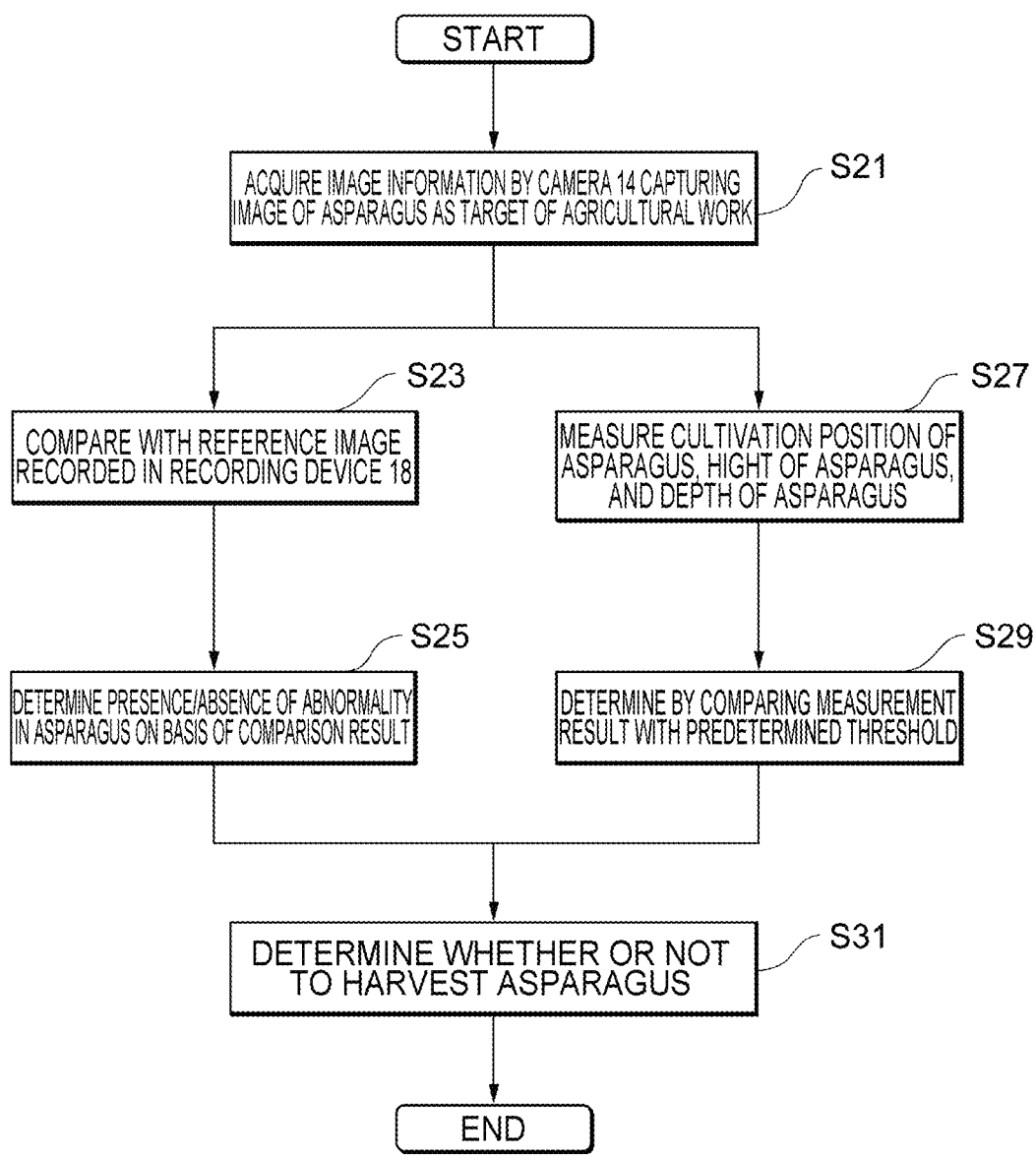
FIG. 10 is a flowchart illustrating an example of the flow of agricultural work determination processing according to one embodiment of the present invention.
Figure 11:
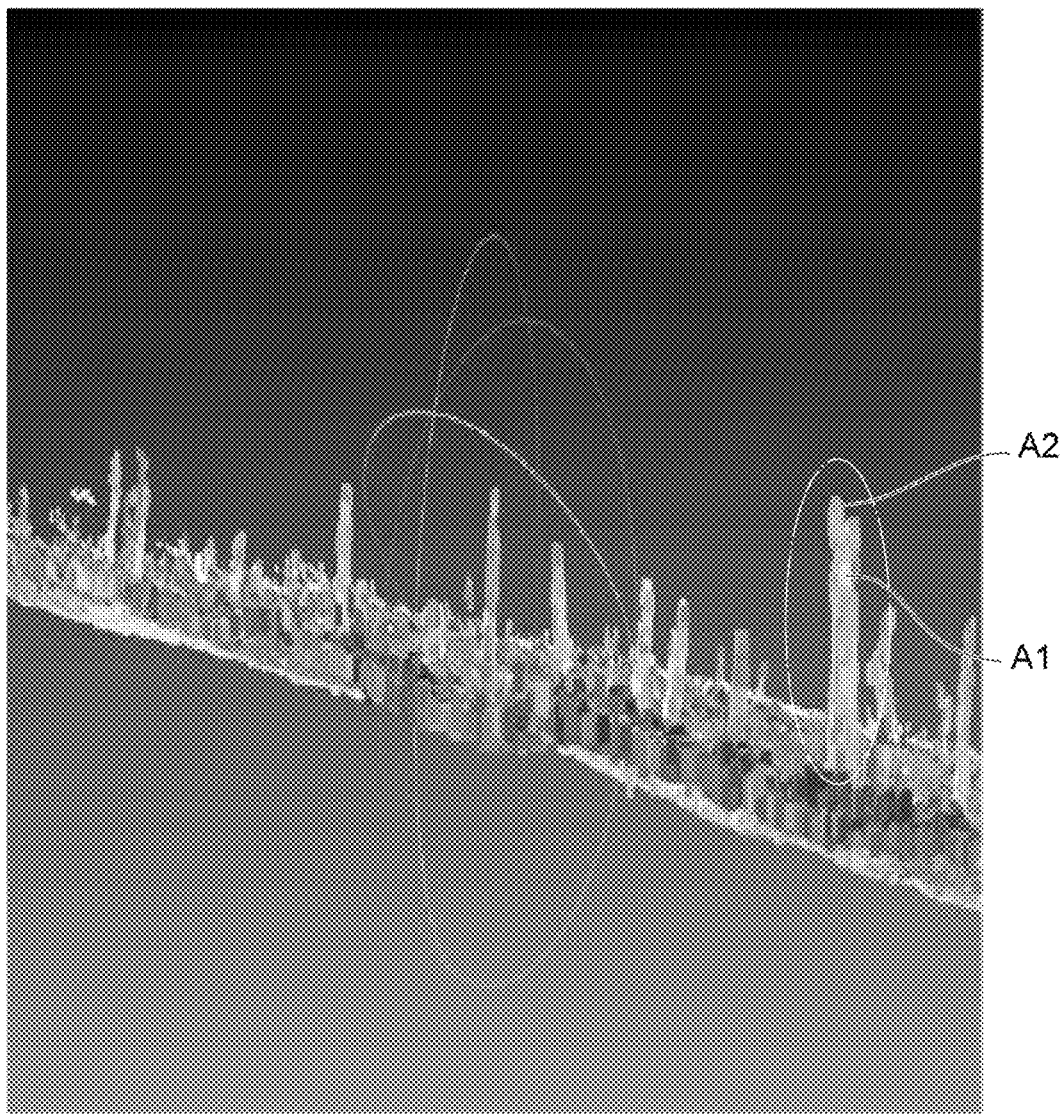
FIG. 11 is a diagram for describing an example of image processing in the agricultural work determination processing according to one embodiment of the present invention.
Figure 12:
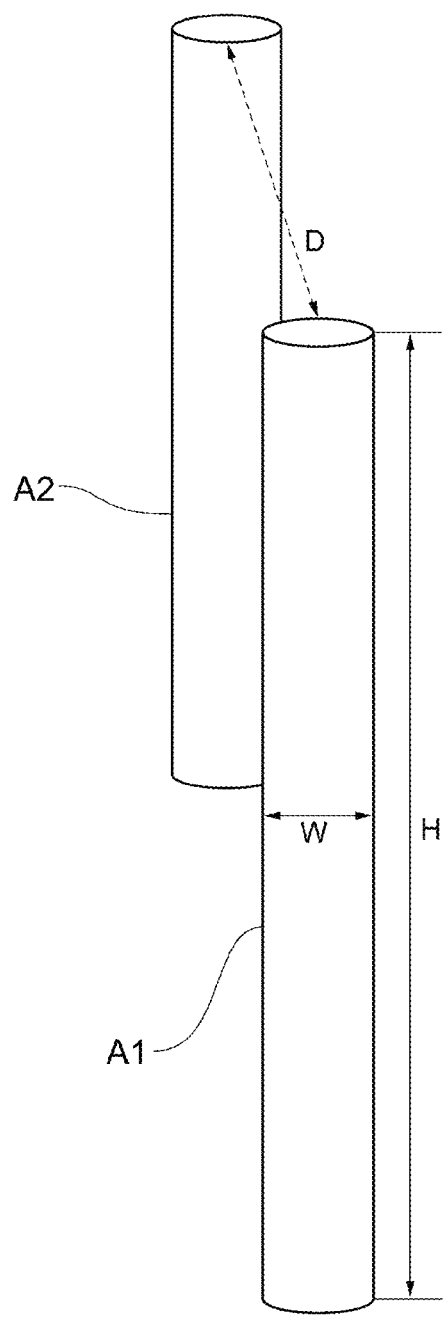
FIG. 12 is a diagram for describing an example of crop measurement processing in the agricultural work determination processing according to one embodiment of the present invention.

Referring to FIG. 10 to FIG. 12, the flow of agricultural work determination processing according to one embodiment of the present invention is described. FIG. 10 is a flowchart illustrating an example of the flow of agricultural work determination processing according to one embodiment of the present invention. FIG. 11 is a diagram illustrating an example of image information obtained by imaging by the camera in the agricultural work apparatus according to one embodiment of the present invention.

(Step S21)

As illustrated in FIG. 11, the camera 14 in the agricultural work apparatus 1 illustrated in FIG. 2 images an asparagus group as a target of agricultural work to acquire an image (first image information).

(Step S23)

The abnormality determination unit 32 in the agricultural work apparatus 1 illustrated in FIG. 2 compares the image (first image information) acquired at Step S21 with, for example, a reference image (second image information) including asparagus as a target of agricultural work, which is recorded in the recording device 18 in the agricultural work apparatus 1. More specifically, the abnormality determination unit 32 utilizes an artificial intelligence model for executing abnormality determination. The artificial intelligence model is formed such that abnormality can be accurately determined by repeated learning based on the results of determination of the presence/absence of abnormality executed in the past. In the artificial intelligence model, a massive amount of images (reference images) used in the past abnormality determination are accumulated. The abnormality determination unit 32 can determine the presence/absence of abnormality in the asparagus in the image acquired at Step S21 by referring to the artificial intelligence model as described below.

(Step S25)

The abnormality determination unit 32 determines the presence/absence of abnormality in the asparagus on the basis of the comparison result at Step S23. For example, the reference images include good asparagus deserving to be harvested, and the abnormality determination unit 32 compares an image obtained by the camera 14 imaging asparagus to be harvested with the reference images including good asparagus to determine whether the asparagus to be actually harvested is good. The reference images include irregular asparagus not deserving to be harvested, and the abnormality determination unit 32 may compare an image obtained by the camera 14 imaging asparagus to be harvested with the reference images including irregular asparagus to determine whether the asparagus to be actually harvested is irregular.

When the color of asparagus to be harvested is brown, which is different from the color (for example, green) of good asparagus included in the reference images, the abnormality determination unit 32 determines that the asparagus to be harvested has some disease. When the shape of asparagus to be harvested has a large curved part, which is different from the shape (for example, a linear shape) of good asparagus included in the reference images, the abnormality determination unit 32 determines that the asparagus to be harvested is irregular.

(Step S27)

The crop measurement unit 30 in the agricultural work apparatus 1 illustrated in FIG. 2 measures the cultivation position, height, and depth of asparagus on the basis of image information obtained by the camera 14 imaging the asparagus. The crop measurement unit 30 may measure the cultivation position of asparagus on the basis of irradiation waves from a measurement laser (not shown) included in the agricultural work apparatus 1 and reflected waves from the asparagus. The agricultural work apparatus 1 may use both of the camera 14 and the measurement laser to measure the cultivation position, height, and depth of asparagus.

FIG. 12 is a diagram illustrating an example of image information in which two pieces of asparagus A1 and A2 included in the broken-line part in FIG. 11 are enlarged. As illustrated in FIG. 12, for example, the crop measurement unit 30 can measure a difference D in position between the asparagus A1 and the asparagus A2 by measuring XYZ coordinates (position) of the distal end and the (root) of each of the pieces of asparagus A1 and A2 on the basis of the image information from the camera 14. The crop measurement unit 30 can measure the height H (dimension) of the asparagus A1 and the width W (dimension) of the asparagus A1.

(Step S29)

The crop measurement unit 30 compares the measured dimension with a set threshold to determine the state of the asparagus. When the measured height of the asparagus A1 is 30 cm, which is more than a set threshold (26 cm), the crop measurement unit 30 determines that the asparagus A1 has grown to a degree to be harvested. On the other hand, when the measured height of the asparagus A1 is 15 cm, which is less than the set threshold (26 cm), the crop measurement unit 30 determines that the asparagus A1 has not grown to a degree to be harvested. The crop measurement unit 30 may compare the measured width of asparagus with a set threshold to determine the state of the asparagus. The "threshold" is not limited to a set threshold, and may be a predetermined threshold.

(Step S31)

The agricultural work determination unit 34 in the agricultural work apparatus 1 illustrated in FIG. 2 determines whether or not to harvest the asparagus on the basis of the determination result output by the abnormality determination unit 32 and the determination result output by the crop measurement unit 30. For example, when the determination result of the abnormality determination unit 32 is "no abnormality" and the determination result of the crop measurement unit 30 is "26 cm or more: has sufficiently grown", the agricultural work determination unit 34 determines "to harvest" in the meaning that the asparagus is enough to be shipped. When the determination result of the abnormality determination unit 32 is "abnormal" and the determination result of the crop measurement unit 30 is "26 cm or less: has not sufficiently grown", the agricultural work determination unit 34 determines "to harvest" in the meaning that the asparagus will not be deserve to be shipped even if the asparagus grows in the future. In this case, the asparagus is wasted after harvested. Further, also when the determination result of the abnormality determination unit 32 is "abnormal" and the determination result of the crop measurement unit 30 is "26 cm or more: has sufficiently grown", the agricultural work determination unit 34 determines "to harvest" in the meaning that the asparagus does not deserve to be shipped. Also in this case, the asparagus is wasted after harvested. Further, when the determination result of the abnormality determination unit 32 is "no abnormality" and the determination result of the crop measurement unit 30 is "26 cm or less: has not sufficiently grown", the asparagus is not irregular and has no disease, and hence the agricultural work determination unit 34 determines "not to harvest" in the meaning of waiting until the asparagus to be harvested grows to a degree to be harvested.

In this manner, the agricultural work determination unit 34 determines whether or not to harvest a target in comprehensive consideration of the determination result of the abnormality determination unit 32 and the determination result of the crop measurement unit 30, and hence more accurate determination can be executed as compared with the case where the agricultural work determination unit 34 determines whether or not to execute agricultural work on the basis of any one of the determination result of the crop measurement unit 30 and the determination result of the abnormality determination unit 32.

[Agricultural Work Execution Processing]

Figure 13:
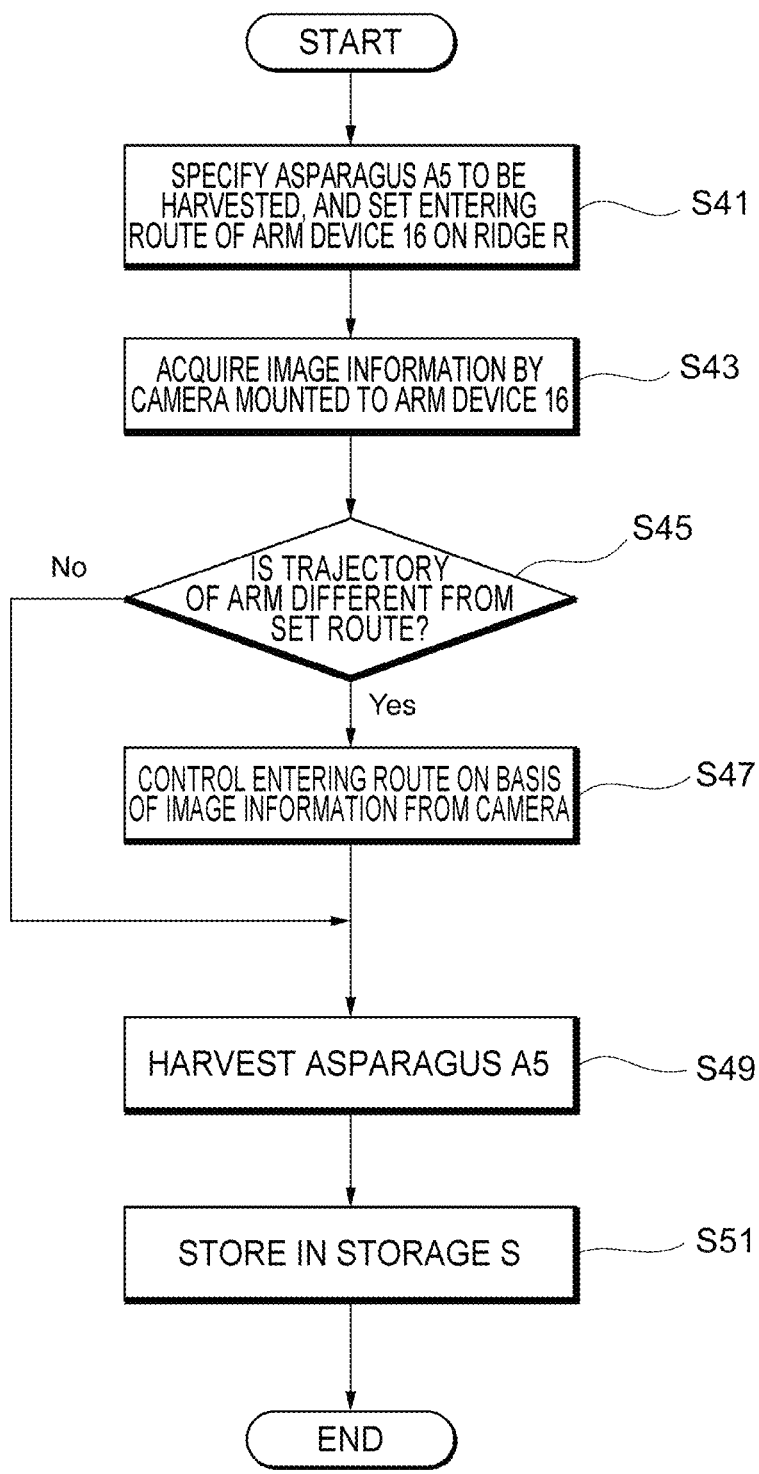
FIG. 13 is a flowchart illustrating an example of the flow of agricultural work execution processing according to one embodiment of the present invention.
Figure 14:
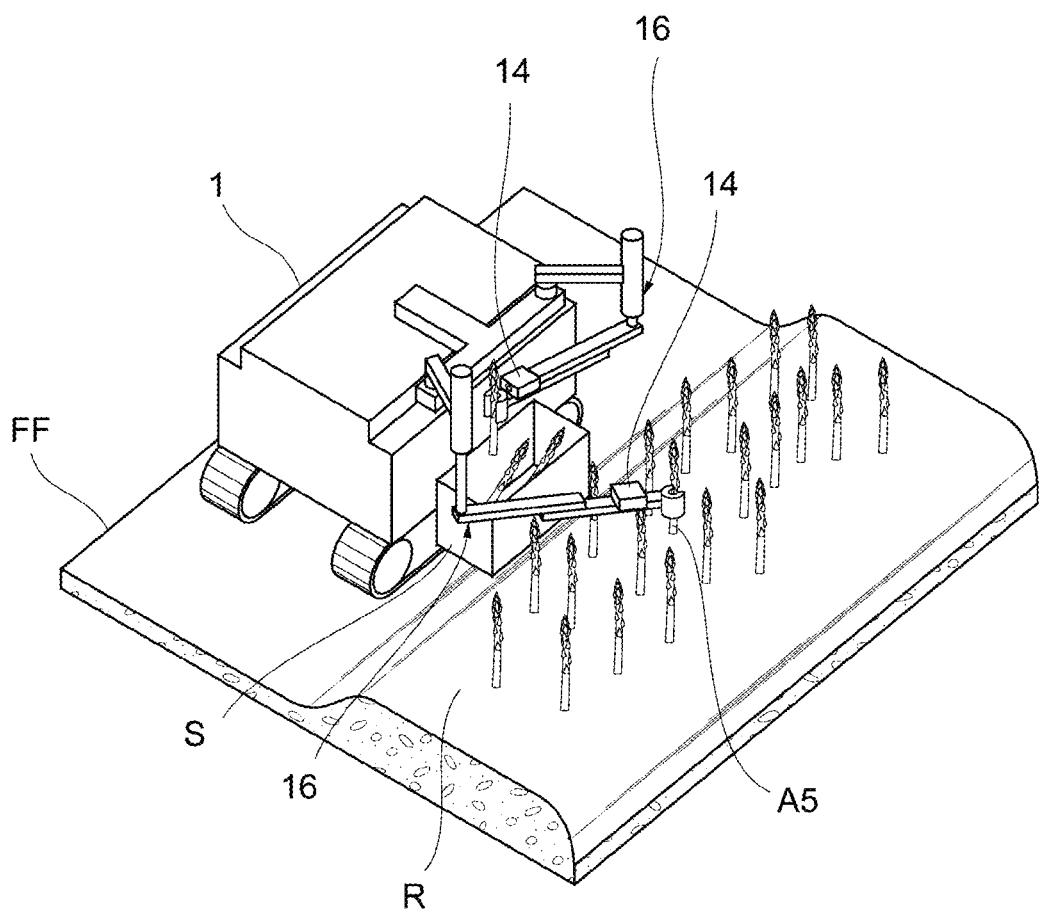
FIG. 14 is a diagram illustrating an example of agricultural work executed by the agricultural work apparatus in a field according to one embodiment of the present invention.

Referring to FIG. 13 and FIG. 14, the flow of agricultural work execution processing according to one embodiment of the present invention is described. FIG. 13 is a flowchart illustrating an example of the flow of agricultural work execution processing according to one embodiment of the present invention. FIG. 14 is a diagram illustrating an example of agricultural work executed by the agricultural work apparatus in the field according to one embodiment of the present invention.

(Step S41)

As described above at Step S29 in FIG. 10, the crop measurement unit 30 crop measurement unit 30 illustrated in FIG. 2 measures the cultivation position, height, and depth of asparagus A5. Next, based on the measurement result of the crop measurement unit 30, the agricultural work execution unit 36 sets an entering route of the arm devices 16 for harvesting the asparagus A5, for example, an entering route from the current positions of the arm devices 16 to the position at which the asparagus A5 is disposed on the ridge R in the field FF illustrated in FIG. 14. The entering route may include a route from three-dimensional coordinate positions of the arm devices 16 to a three-dimensional coordinate position indicating a cutting point of the asparagus A5 on the ridge R in the field FF illustrated in FIG. 14. The entering route may be set after the agricultural work execution unit 36 generates the entering route, or may be set by the agricultural work execution unit 36 after the crop measurement unit 30 generates the entering route on the basis of the measurement result.

(Step S43)

For example, image information (third image information) is acquired by the camera 14 (second image-capturing device) mounted to the arm device 16. The camera 14 (second image-capturing device) mounted to the arm device 16 can more accurately measure the actual entering route of the arm device 16 as compared with a camera mounted to the main body of the agricultural work apparatus 1.

(Step S45)

The agricultural work execution unit 36 determines, on the basis of the acquired image information, whether the entering route of the arm device 16 is different from the entering route set at Step S41. When the entering route of the arm device 16 is not different from the entering route set at Step S41 (No), the flow proceeds to Step S49. On the other hand, when the entering route of the arm device 16 is different from the entering route set at Step S41 (Yes), the flow proceeds to Step S47.

(Step S47)

The agricultural work execution unit 36 controls the entering route of the arm device 16 on the basis of the image information from the camera 14. For example, when the entering route of the arm device 16 is different from the entering route set at Step S41, the asparagus A5 may fail to be reliably harvested, and hence the entering route of the arm device 16 is corrected to a correct route to reliably harvest the asparagus A5. For example, the entering route includes a route from the three-dimensional coordinate position of the arm device 16 to the three-dimensional coordinate position indicating the cutting point of the asparagus A5 on the ridge R in the field FF illustrated in FIG. 14, the agricultural work execution unit 36 may correct the deviation of the cutting point on the basis of the image information from the camera 14.

(Step S49)

The agricultural work execution unit 36 uses the arm device 16 to harvest the asparagus A5.

(Step S51)

The agricultural work execution unit 36 uses the arm device 16 to store the harvested asparagus A5 in a storage S.

As described above, according to this embodiment, agricultural work information and the position of a target of agricultural work are managed in association with each other, and hence the agricultural work information can be appropriately managed, and agricultural work and business can be smoothly implemented in the future by making use of the agricultural work information.

As illustrated in FIG. 2 and FIG. 10, the agricultural work determination unit 34 determines whether or not to harvest a target in comprehensive consideration of the determination result of the abnormality determination unit 32 and the determination result of the crop measurement unit 30. Consequently, more accurate determination can be executed as compared with the case where the agricultural work determination unit 34 determines whether or not to execute agricultural work on the basis of at least one of the determination result of the crop measurement unit 30 and the determination result of the abnormality determination unit 32.

Other Embodiments

Each of the above-mentioned embodiments intends to facilitate the understanding of the present invention, and is not interpreted by limiting the present invention. The present invention can be modified and improved (for example, combining the embodiments and omitting a part of the configurations in each embodiment) without departing from the gist thereof, and the present invention includes equivalents thereof.

In the above-mentioned embodiment, the output information generation unit 62 is included in the agricultural work management server 5 as illustrated in FIG. 7. However, the output information generation unit may be included in the mobile terminal 3 illustrated in FIG. 1. In this case, the agricultural work management server 5 transmits agricultural work information to the mobile terminal 3, and the mobile terminal 3 generates output information and outputs the generated output information from the output unit 7 in the mobile terminal 3. As illustrated in FIG. 7, the agricultural work prediction unit 60 is included in the agricultural work management server 5. However, the agricultural work prediction unit 60 may be included in the mobile terminal 3 or the agricultural work apparatus 1. Further, as illustrated in FIG. 2, at least one component of the crop measurement unit 30, the abnormality determination unit 32, the agricultural work determination unit 34, the agricultural work execution unit 36, the agricultural work information generation unit 38, and the agricultural work information management unit 40 may be included in the agricultural work management server 5 or the mobile terminal 3. In this manner, each component included in each of the agricultural work apparatus 1, the mobile terminal 3, and the agricultural work management server 5 may be included in another configuration within the range not causing contradiction of processing contents.

In the above-mentioned embodiment, as illustrated in FIG. 2 and FIG. 10, the agricultural work determination unit 34 determines whether or not to execute agricultural work on the basis of the determination result of the crop measurement unit 30 and the determination result of the abnormality determination unit 32. However, the agricultural work determination unit 34 may simply determine whether or not to execute agricultural work on the basis of at least one of the determination result of the crop measurement unit 30 and the determination result of the abnormality determination unit 32.

In the above-mentioned embodiment, the agricultural work information, the positional information, and the date and time information are transmitted from the agricultural work apparatus 1 to the mobile terminal 3 through the agricultural work management server 5. However, the agricultural work information may be transmitted to the mobile terminal 3 directly from the agricultural work apparatus 1. In the above-mentioned embodiment, the agricultural work information, the positional information, and the date and time information are output from the output unit 7 in the mobile terminal 3 illustrated in FIG. 1. However, the agricultural work information, the positional information, and the date and time information may be output from an output unit (not shown) included in the agricultural work apparatus 1.

REFERENCE SIGNS LIST

1 Agricultural work apparatus
3 Mobile terminal
5 Agricultural work management server
7 Output unit
10 Central processing device
12 GPS sensor
14 Camera 16 Arm device
18 Recording device
20 Communication device
22 Drive device
30 Crop measurement unit
32 Abnormality determination unit
34 Agricultural work determination unit
36 Agricultural work execution unit
38 Agricultural work information generation unit
40 Agricultural work information management unit
50 Communication unit
52 Information processing unit
54 Recording unit
60 Agricultural work prediction unit
62 Output information generation unit
100 Agricultural work management system

What is claimed is:

1. An agricultural work apparatus, comprising:
a first image-capturing device;
an agricultural work determination unit that determines, on the basis of first image information obtained by capturing an image of a target of agricultural work through the first image-capturing device, whether or not to execute the agricultural work on the target;
an agricultural work execution unit that executes the agricultural work on the basis of a determination result of the agricultural work determination unit;
an agricultural work information generation unit that generates agricultural work information including a result of the agricultural work;
a measurement unit that measures a position of the target;
an agricultural work information management unit that manages the agricultural work information and positional information indicating the measured position; and
a quality determination unit that determines a quality of the target on the basis of the first image information and second image information that is at least one reference image including the target,
wherein the measurement unit measures a dimension of the target on the basis of the first image information, and
wherein the agricultural work determination unit determines whether or not to execute the agricultural work on the target on the basis of a result of a comparison between the measured dimension and a set threshold and the quality determined by the quality determination unit.

2. The agricultural work apparatus according to claim 1, wherein the agricultural work information management unit records time information indicating a time at which the position of the target is measured in association with the agricultural work information and the positional information.

3. The agricultural work apparatus according to claim 1, further comprising:
an arm device for executing the agricultural work, wherein the agricultural work execution unit controls the operation of the arm device on the basis of the position of the target measured by the measurement unit.

4. The agricultural work apparatus according to claim 3, wherein
the arm device includes a second image-capturing device, and
the agricultural work execution unit controls the operation of the arm device on the basis of third image information obtained by the second image-capturing device imaging the target.

5. The agricultural work apparatus according to claim 1, further comprising:
a drive device that controls the agricultural work apparatus to move along a predetermined route, wherein
the drive device controls the movement of the agricultural work apparatus after the agricultural work determination unit determines whether or not to execute the agricultural work on the target included in the first image information.

6. The agricultural work apparatus according to claim 5, wherein
the first image-capturing device detects a marker disposed on the route, and
the drive device controls the movement of the agricultural work apparatus on the basis of the detected marker.

7. The agricultural work apparatus according to claim 1, wherein
the position of the target measured by the measurement unit includes a position at which the first image-capturing device captures the image of the target.

8. An agricultural work management system, comprising:
the agricultural work apparatus according to claim 1; and
an agricultural work management server, wherein
the agricultural work apparatus transmits the agricultural work information indicating a result of the agricultural work and the positional information to the agricultural work management server, and
the agricultural work management server includes an agricultural work prediction unit that predicts a content of the agricultural work to be executed on the target on the basis of the agricultural work information and the positional information.

9. The agricultural work management system according to claim 8, further comprising:
a mobile terminal including an output unit, wherein
the agricultural work management server further includes an output information generation unit that generates output information for outputting the agricultural work information and the positional information in association with each other in a predetermined output form, and
the output unit outputs the agricultural work information and the positional information in the predetermined output form on the basis of the output information.

10. A non-transitory readable recording medium that stores a program that causes an agricultural work apparatus including an image-capturing device to function as:
an agricultural work determination unit that determines, on the basis of first image information obtained by capturing an image of a target of agricultural work through the first image-capturing device, whether or not to execute the agricultural work on the target;
an agricultural work execution unit that executes the agricultural work on the basis of a determination result of the agricultural work determination unit;
an agricultural work information generation unit that generates agricultural work information including a result of the agricultural work;
a measurement unit that measures a position of the target;
an agricultural work information management unit that manages the agricultural work information and positional information indicating the measured position; and a quality determination unit that determines a quality of the target on the basis of the first image information and second image information that is at least one reference image including the target, wherein the measurement unit measures a dimension of the target on the basis of the first image information, and wherein the agricultural work determination unit determines whether or not to execute the agricultural work on the target on the basis of a result of a comparison between the measured dimension and a set threshold and the quality determined by the quality determination unit.

11. The agricultural work apparatus of claim 6, wherein the first image-capturing device detects the marker disposed past an end of a ridge comprising the target.

12. The agricultural work apparatus of claim 1, wherein the at least one reference image of the second image information comprises a plurality of reference images, and wherein the quality determination unit employs a trained machine learning model that is trained using the plurality of reference images, such that the quality determination unit is configured to apply the first image information to the trained machine learning model to determine the quality in the target.

13. The agricultural work apparatus of claim 1, wherein the agricultural work comprises weed removal.

14. The agricultural work apparatus of claim 1, wherein the agricultural work comprises spraying one or more chemicals.

15. The agricultural work apparatus of claim 1, wherein the agricultural work comprises harvesting the target.

\* \* \* \* \*